United States Patent
Nakao et al.

(10) Patent No.: US 7,181,831 B2
(45) Date of Patent: Feb. 27, 2007

(54) METHOD OF MANUFACTURING STRAIN SENSOR

(75) Inventors: Keiichi Nakao, Hirakata (JP); Yukio Mizukami, Fukui (JP); Hiroaki Ishida, Fukui (JP); Toshiro Otobe, Sakai-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 341 days.

(21) Appl. No.: 10/937,497

(22) Filed: Sep. 10, 2004

(65) Prior Publication Data

US 2005/0028605 A1 Feb. 10, 2005

Related U.S. Application Data

(62) Division of application No. 10/451,668, filed as application No. PCT/JP02/10259 on Oct. 2, 2002, now Pat. No. 7,010,986.

(30) Foreign Application Priority Data

Oct. 2, 2001 (JP) .............................. 2001-306132

(51) Int. Cl.
*H01C 17/28* (2006.01)

(52) U.S. Cl. ..................... 29/621.1; 29/610.1; 29/620; 29/885; 73/776; 257/741; 257/763

(58) Field of Classification Search ............... 29/621.1, 29/610.1, 620, 885; 73/776; 257/741, 763
See application file for complete search history.

(56) References Cited

U.S. PATENT DOCUMENTS

| | | | |
|---|---|---|---|
| 4,680,858 A | * | 7/1987 | Johnson ..................... 29/621.1 |
| 6,345,543 B1 | | 2/2002 | Aoki ....................... 73/862.474 |
| 6,427,539 B1 | * | 8/2002 | Chen et al. ................... 73/726 |

FOREIGN PATENT DOCUMENTS

| | | |
|---|---|---|
| JP | 54-129889 | 10/1979 |
| JP | 7-167720 | 7/1995 |
| JP | 7-307210 | 11/1995 |
| JP | 8-304200 | 11/1996 |
| JP | 9-243472 | 9/1997 |
| JP | 10-148591 | 6/1998 |
| JP | 2000-180255 | 6/2000 |

* cited by examiner

*Primary Examiner*—A. Dexter Tugbang
*Assistant Examiner*—Tim Phan
(74) *Attorney, Agent, or Firm*—Steptoe & Johnson LLP

(57) ABSTRACT

A strain sensor comprising a metal substrate, a first electrode provided on the metal substrate, a glass layer formed on the first electrode, and a second electrode and a strain detecting resistor provided on the glass layer. In the strain sensor, the insulation resistance between the metal substrate and the second electrode has been raised, and the reliability is high. It can be implemented at low cost.

3 Claims, 8 Drawing Sheets

METHOD OF MANUFACTURING STRAIN SENSOR

This is a Division of application Ser. No. 10/451,668 filed Jun. 25, 2003, now U.S. Pat. No. 7,010,986, which in turn is a national stage entry of International Application No. PCT/JP 02/10259 filed Oct. 2, 2002 designating the U.S., which claims the benefit of Japanese Application No. 2001-306132 filed Oct. 2, 2001.

TECHNICAL FIELD

The present invention relates to a strain sensor which detects an external force generated by the weight of a human body, weight of a vehicle, etc., through detection of a strain caused in a strain detecting resistor.

BACKGROUND ART

A conventional strain sensor disclosed in Japanese Patent Laid-Open Application No. 2000-180255 is structured of one glass layer and one overcoat glass layer. In the following, a conventional strain sensor is described referring to drawings. FIG. 7 shows plan view of a conventional strain sensor.

Metal substrate 1 is provided at one end with first fixing hole 20, second fixing hole 21 at the other end, and detection hole 22 in the approximate middle part. On the upper surface of metal substrate 1, glass layer 2 is formed, and four strain detecting resistors 6 are provided thereon. Strain detecting resistors 6 are electrically connected by wiring 11 and second electrode 5 to form a bridge circuit. Strain detecting resistors 6 and second electrode 5 are protected by overcoat glass layers 7a, 7b.

FIG. 8 shows cross sectional view of a conventional strain sensor, sectioned along the line A–A' of FIG. 7. Since glass layers 2a, 2b and 2c are made of same lead borosilicate system glass material, these layers are integrated into a single layer after being sintered. So, individual glass layers can not be distinguished severally in the layer.

In FIG. 8, these glass layers 2a, 2b and 2c are illustrated severally by providing a broken line between the layers for the sake of easy understanding. Round voids 9 are scattered at random within the glass layers after sintering.

Reason why the glass layer in FIG. 8 is illustrated in three layers is that Japanese Patent Laid-Open Application No. H09-243472 teaches formation of a multi-layered insulation layer by printing a 20 μm thick glass paste of lead borosilicate system glass material and sintering it for three times (printing-sintering is repeated for three times), instead of using enamel or crystalline glass.

A method of assembling a conventional strain sensor is described in the following with reference to FIG. 7.

On the upper surface of already-prepared metal substrate 1, a glass paste is screen-printed and sintered at an approximate temperature of 850° C. for forming glass layer 2 on the upper surface of metal substrate 1. On the upper surface of glass layer 2, a conductive paste of Ag and Pt is screen-printed and sintered at an approximate temperature of 850° C. for forming wiring 11 and second electrode 5 on the upper surface of glass layer 2. And then, a Ru system resistance paste is printed covering part of glass layer 2 and second electrode 5, and sintered at an approximate temperature of 850° C. for forming strain detecting resistor 6. Finally, a glass paste is screen-printed covering glass layer 2, wiring 11, strain detecting resistor 6, and sintered for forming overcoat glass layers 7a, 7b.

If a window is provided in advance in the pattern of overcoat glass layer, a chip component or semiconductor device can be mounted and connected with wiring 11 which is exposed through the window. Operation of the above-configured conventional strain sensor is described below. Metal substrate 1 is fixed, at first fixing hole 20 and second fixing hole 21, on a fixed member (not shown) by means of bolt (not shown) and nut (not shown), and then a detection member (not shown) is fixed to detection hole 22. When an external force F is given from the above on the detection member (not shown), a deformation is caused on metal substrate 1.

As a result, strain detecting resistors 6 disposed on the upper surface of metal substrate 1 receive a compressive stress or a tensile stress, and the resistance value in each of respective strain detecting resistors 6 changes. Strain detecting resistors 6 are connected by wiring 11 to form a bridge circuit, and an external force F exerted on detection member (not shown) is detected in the form of differential voltage detected at the bridge. FIG. 4A shows relationship between the number of glass layers and the insulation resistance in conventional strain sensor as shown in FIG. 7, FIG. 8. FIG. 4A shows that the insulation resistance is in the level of ninth to eleventh power of 10, when the number of glass layers is as many as 3–4 layers. However, when the number of glass layers decreased to 2 layers, the insulation resistance decreased to the level of sixth to tenth power of 10. When the glass layer count decreased to 1, the insulation resistance decreased further down. According to result of measurement conducted on 1-layer glass layers, the insulation resistance was mostly lower than 1Ω, or a state of short circuit; only a limited number of samples showed several hundreds KΩ. In the graph of FIG. 4A, the insulation resistance of 1-layer glass is shown to have the fifth power of 10, for the sake of simplification. As described in the above, the insulation resistance decreases sharply when the glass layer counts go lower (or, the glass layer thickness goes thinner), among those having conventional structure. The insulation resistance value also disperses wide, which generates a problem in the products reliability.

In practice, a strain sensor needs an insulation resistance that is in the ninth power of 10, or higher; which means that in the conventional structure three or more glass layers are needed.

This leads to a higher cost of finished products.

DISCLOSURE OF INVENTION

The present invention offers a strain sensor which comprises a metal substrate, a first electrode formed on said metal substrate, a glass layer formed on said first electrode, a second electrode formed on said glass layer and a strain detecting resistor.

DETAILED DESCRIPTION OF PREFERRED EMBODIMENTS

Embodiment 1

Figure 1:
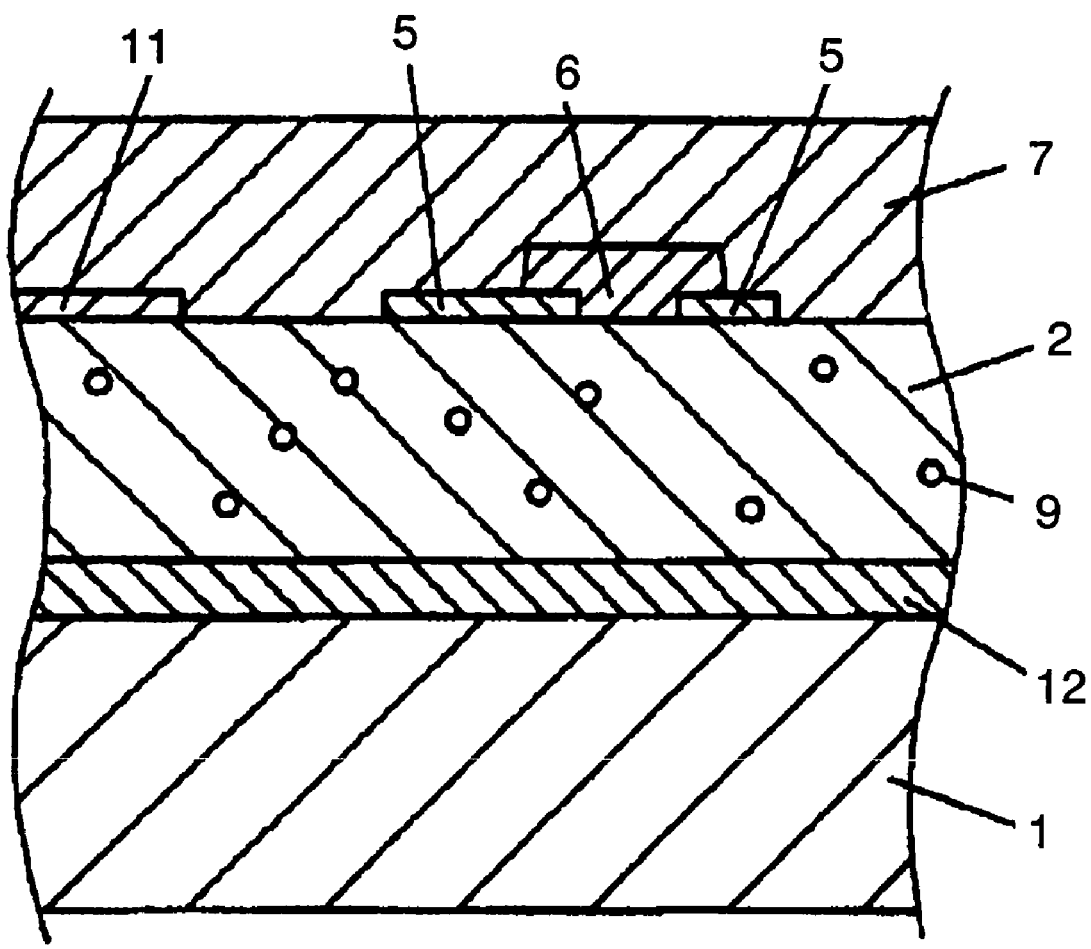
FIG. 1 shows a cross sectional view used to describe a strain sensor in accordance with the present invention.

FIG. 1 shows the structure of a strain sensor in accordance with an exemplary embodiment of the present invention. The drawing is intended to provide the concept of the invention, so the illustration does not give precise dimensions. On the upper surface of metal substrate 1, first electrode 12 is formed, and second electrode 5, strain detecting resistor 6 connected with second electrode 5 and wiring 11 are provided thereon via glass layer 2.

Wiring 11 is connected to second electrode 5 with a certain specific pattern. Overcoat glass layer 7 is further provided thereon.

Figure 7:
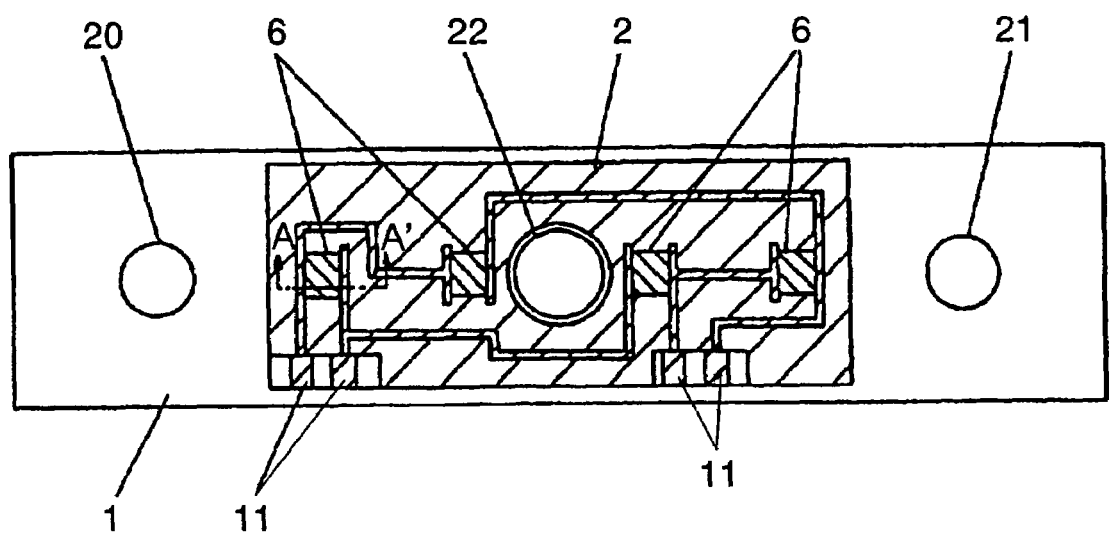
FIG. 7 shows plan view of a conventional strain sensor.
Figure 8:
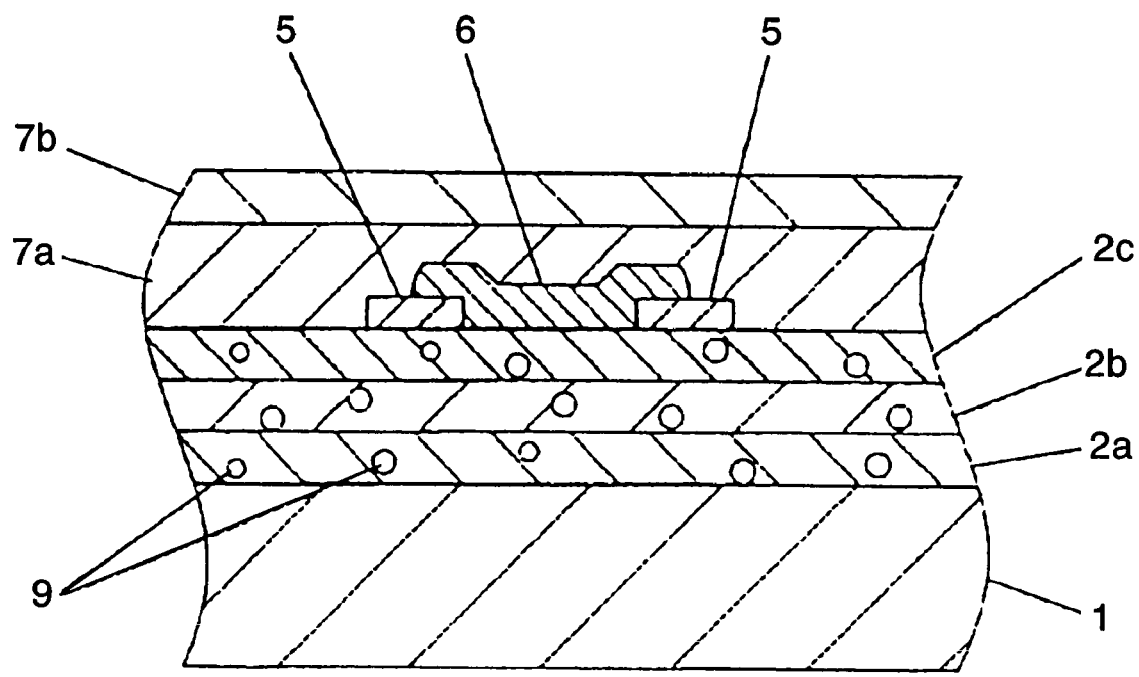
FIG. 8 shows cross sectional view of a conventional strain sensor.

Round voids 9 are voids generated at sintering process. A key point of difference of FIG. 1 as compared to FIG. 7, or the conventional structure, is whether there is first electrode 12 disposed between metal substrate 1 and glass layer 2, or not.

In the present invention, first electrode 12 is inserted between second electrode 5, wiring 11 and metal substrate 1; this contributes to keep the insulation resistance between second electrode 5, wiring 11 and metal substrate 1 high.

As a result, the short-circuit rejects can be reduced significantly.

Next, a method of manufacturing is described referring to FIG. 2A–FIG. 4B.

Figure 2A:
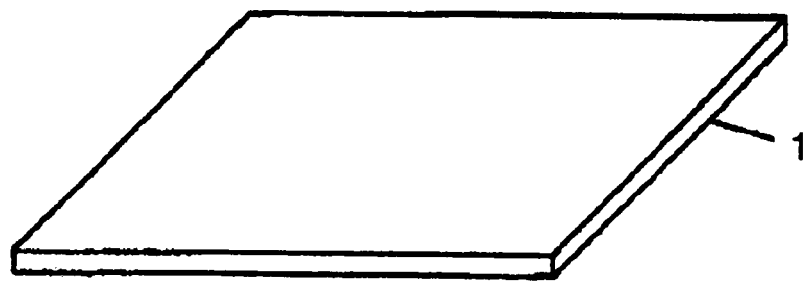
FIG. 2A–FIG. 2D are drawings used to describe a method of manufacturing a conventional strain sensor.

FIG. 2A–FIG. 2D are used to describe a method of manufacturing conventional strain sensors. FIG. 2A shows metal substrate 1. Metal substrate 1 may be provided optionally in various shapes depending on needs.

Figure 2B:
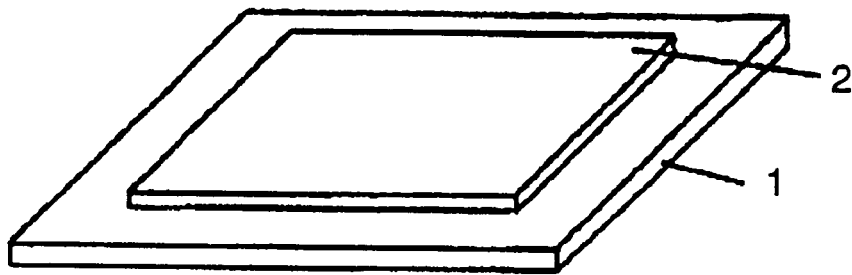
Figure 2C:
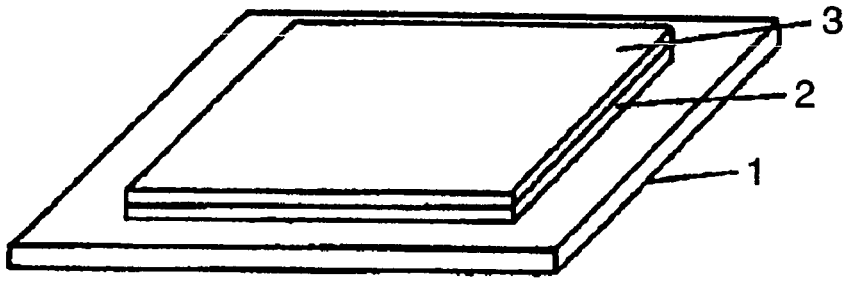

Next, as shown in FIG. 2B, glass layer 2 is formed on the upper surface of metal substrate 1. The glass layer is formed by screen-printing a glass paste normally available in the market and sintering it at 850° C. using a belt furnace. Furthermore, glass layer 3 is formed thereon, as shown in FIG. 2C. Providing glass layer for more than one layer, viz. in the multi-layered way, is effective to prevent generation of pin-holes or the like trouble which might arise during the printing process. Next, as shown in FIG. 2D, second electrode 5 is provided on the glass layer of multi-layered structure.

In the actual manufacturing process of strain sensors, second electrode 5 has a complicated pattern shape, and strain detecting resistors and protection layer are provided thereon before completing finished strain sensors.

Figure 2D:
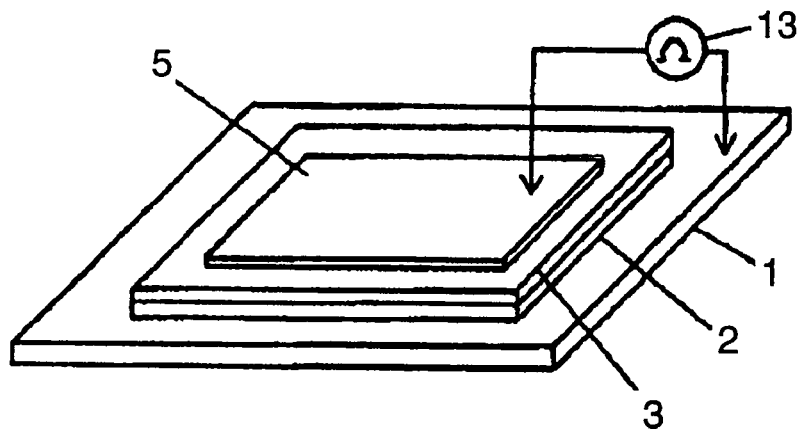
Figure 3A:
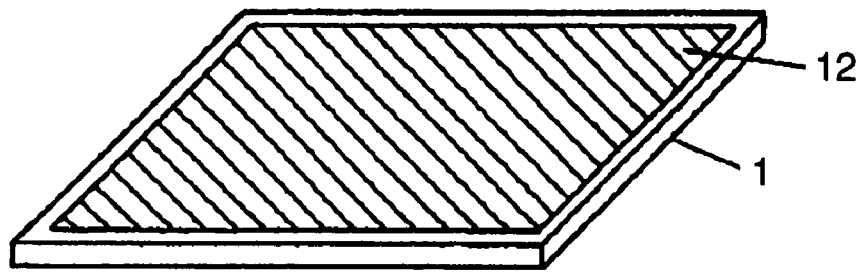
FIG. 3A–FIG. 3D are drawings used to describe a method of manufacturing a strain sensor in accordance with the present invention.
Figure 3B:
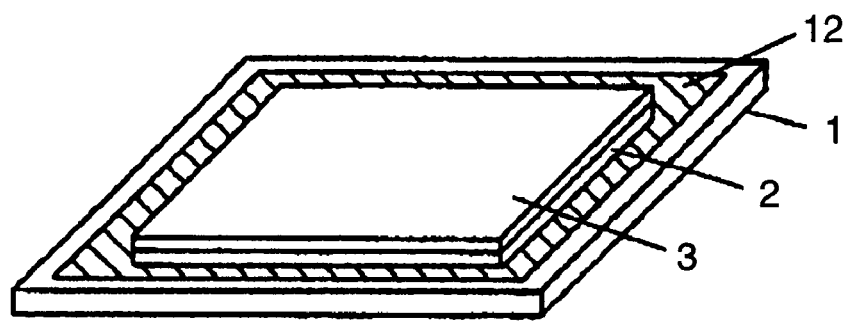

FIG. 2D shows how the insulation resistance is measured between second electrode 5 and metal substrate 1 with insulation resistance meter 13. Drawings in FIG. 3 are used to describe a method of manufacturing strain sensor in accordance with a first exemplary embodiment of the present invention. FIG. 3A shows a state in which first electrode 12 has been formed on metal substrate 1. Metal substrate 1 is made of a 2 mm thick stainless steel sheet. First electrode 12 is formed by screen-printing an electrode ink containing silver as the main ingredient in a certain specific pattern on the metal substrate, and sintering it in a belt furnace at 850° C. Next, as shown in FIG. 3B, glass layers 2 and 3 are provided on first electrode 12.

Figure 3C:
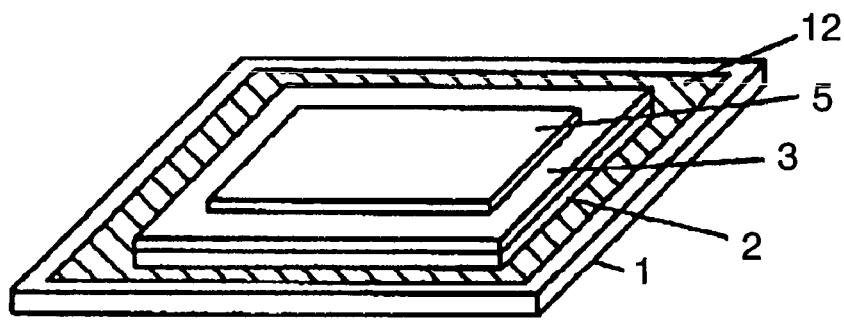
Figure 3D:
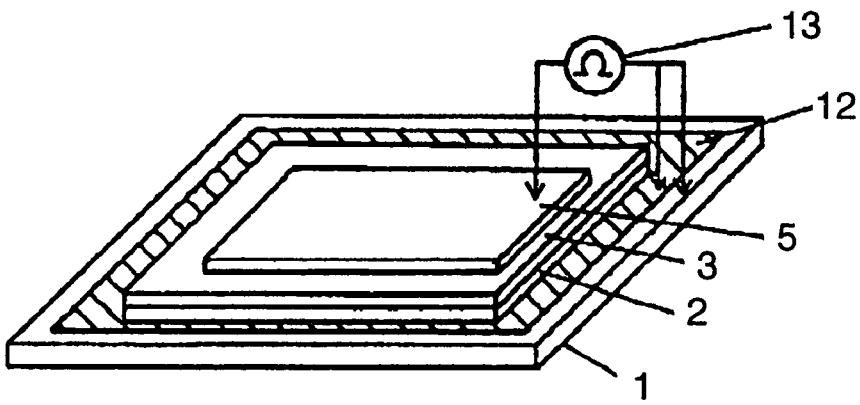
Figure 4A:
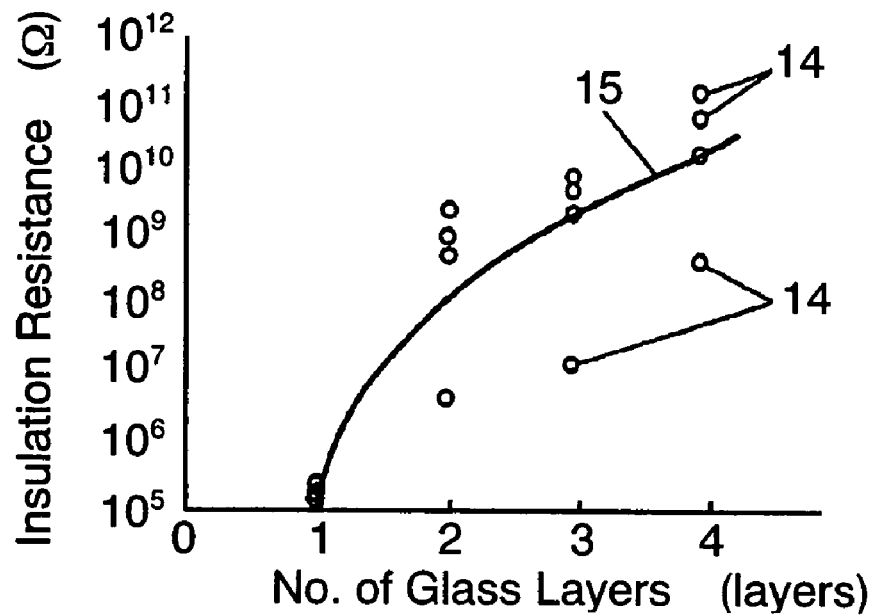
FIG. 4A, FIG. 4B are graphs used to describe relationship between the number of glass layers and the insulation resistance.
Figure 4B:
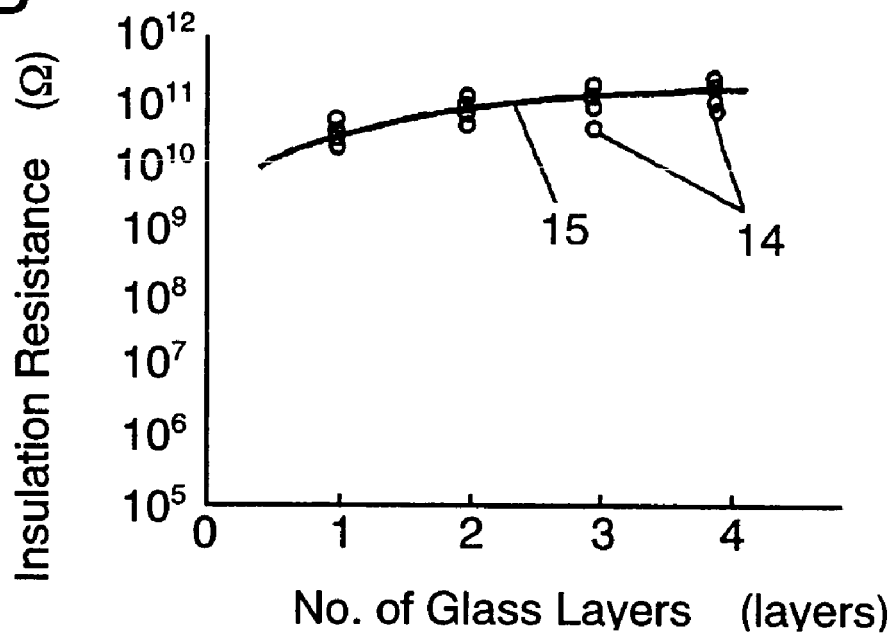

As shown in FIG. 3C, second electrode 5 is formed on glass layer 3. Using the samples thus provided, the insulation resistance between second electrode 5 and metal substrate 1, or between second electrode 5 and first electrode 12, is measured with insulation resistance meter 13, as illustrated in FIG. 3D. FIG. 4A and FIG. 4B show relationship between the number of glass layers and the insulation resistance among the samples which were described referring to FIG. 2 or FIG. 3. The X axis represents the number of glass layers, while Y axis the insulation resistance, unit used there is $\Omega$.

A plurality of measured data 14 has been approximated into extrapolation line 15. FIG. 4A shows the insulation resistance between second electrode 5 and metal substrate 1 in the conventional structure of FIG. 2A–FIG. 2D (corresponding to FIG. 7). FIG. 4A shows that the insulation resistance is high when glass layer counts are as many as 3 to 4 layers, while it steeply decreases along with the decreasing layer counts. FIG. 4A also teaches that the insulation resistance values disperse widely, despite an effort to reduce the influence of pin-holes contained within the glass layers by providing the glass layer in a multi-layered structure. FIG. 4B shows the insulation resistance between second electrode 5 and metal substrate 1 in a structure in accordance with the present invention, as shown in FIG. 3A to FIG. 3D (corresponding to FIG. 1). From FIG. 4B, it is seen that the insulation resistance stays within a range of 10 in the power of ten to eleven, whole through the glass layer counts from 1-layer to 4-layers. Although the insulation resistance decreases slightly along with the decreasing layer counts, from 3-layers, 2-layers to 1-layer, even 1-layered glass layer secures the insulation resistance value to be higher than the tenth power of 10.

Thus in the case of FIG. 4B, even a single-layered glass layer can provide enough insulation resistance. The glass layer may of course be provided in a multi-layered structure, which will be advantageous in suppressing the pin holes due to dust, etc.

Experiments were conducted with the samples that correspond to FIG. 2A through FIG. 4B, using different materials for first electrode 12 and second electrode 5 in the samples. According to the experimental results, gold (Au) electrode does not exhibit the difference as shown between FIG. 4A and FIG. 4B. It has become known from the experiments that a sintered electrode containing Ag (Ag—Pd, Ag—Pt, Ag—Pd—Pt, etc.) used for second electrode 5 is prone to cause the phenomenon of steep decrease in the insulation resistance between metal substrate 1 and second electrode 5, occurred as a result of decreased number of glass layer counts as shown in FIG. 4A. Samples whose electrode paste having no glass component additive likewise exhibited the phenomenon of FIG. 4A. In other experiments in which different kinds of glass (material, softening point, etc.) were used for the glass layer, the steep decrease of insulation resistance was not observed in a region before the glass softening point. The phenomenon readily appeared after the glass exceeded the softening point. Meanwhile, when metal substrate 1 is provided on the surface with first electrode 12 in accordance with the present invention, no such decrease in the insulation resistance was observed, regardless of difference in the kind of glass materials and the softening point.

The sample of FIG. 3A, having no first electrode 12 (the structure of FIG. 7), and the sample of FIG. 3B, having first electrode 12 (the structure of FIG. 1), were scrutinized with SEM in their cross sections. Both of the samples had round void 9, which was described referring to FIG. 7. Although first electrode 12 can not eliminate the voids contained within glass layer, it substantially improves the reliability of such finished products where the number of glass layers has been reduced (glass layer has been thinned).

Figure 5A:
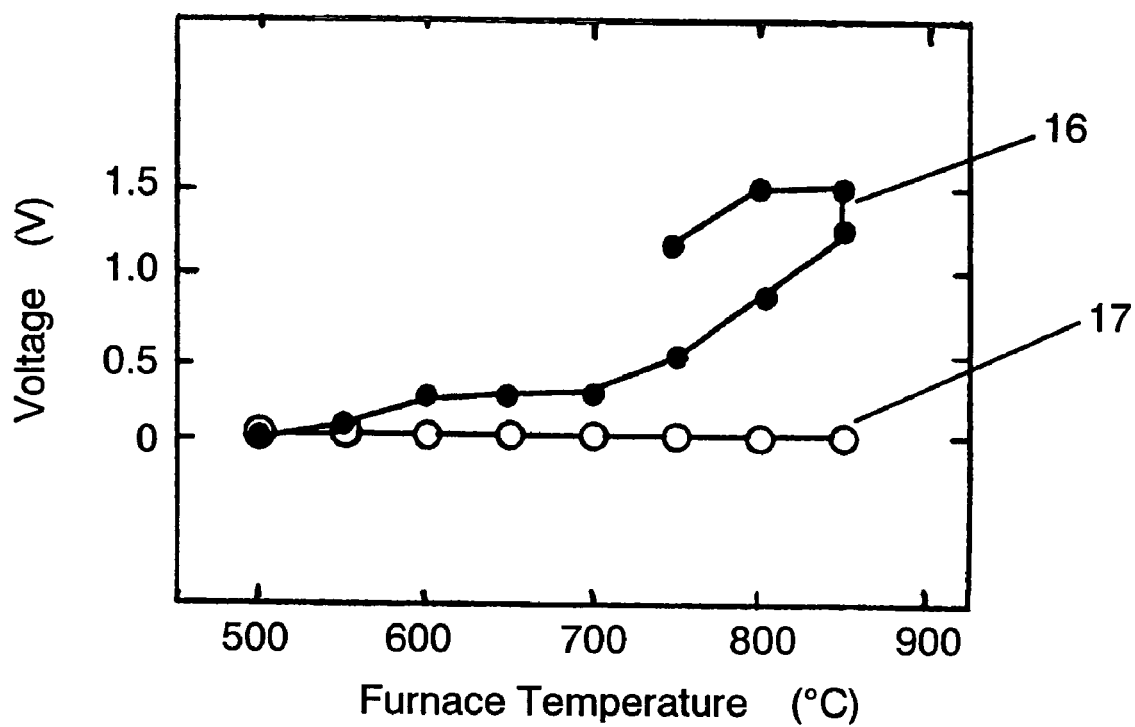
FIG. 5A, FIG. 5B are drawings used describe the voltage between the metal substrate and the second electrode during sintering process.
Figure 5B:
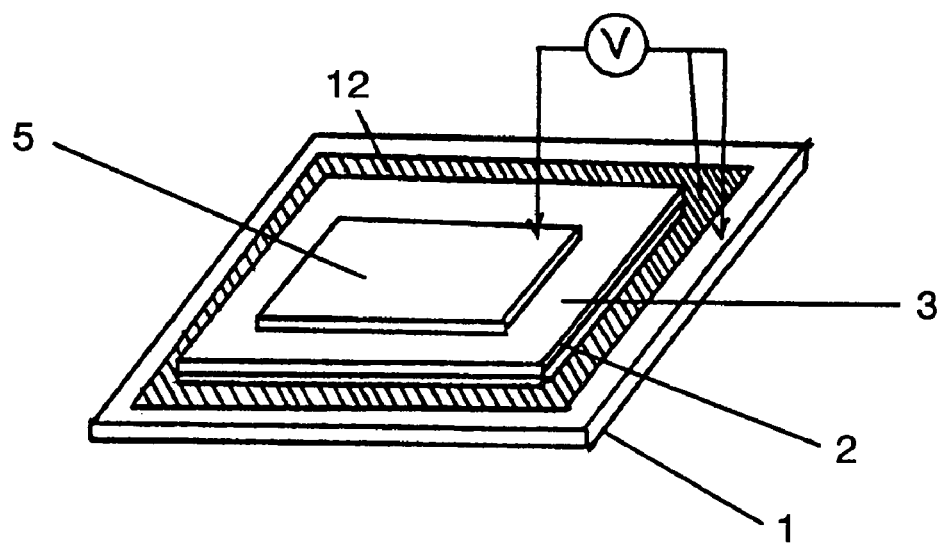

Thus, a superior quality is ensured with the products, and the number of process steps can be reduced to a cost saving. FIG. 5A and FIG. 5B are illustrations used to describe voltage generated between metal substrate and second electrode during sintering. FIG. 5A shows results of the voltage measurement conducted on the samples set in a single furnace, by reading the voltages generated during the sintering procedure.

FIG. 5B shows how the voltage is measured during sintering with the trial sample. As FIG. 5B illustrates, metal substrate 1, second electrode 5, etc. are connected with platinum wire at one end, and the sample in this state is put in a single furnace and the furnace temperature is ramped up (single furnace is not shown). Voltages generated with the sample are measured with a voltmeter connected to the other end of the platinum wire coming out of the single furnace.

In FIG. 5A, curve 16 represents the conventional sample, while curve 17 the present invention. The X axis indicates temperature of a thermocouple disposed in the single furnace, while Y axis indicates voltage read by the voltmeter. Curve 17 shows the voltages with the sample having first electrode (the structure of FIG. 3). It is seen that there is hardly any voltage generated between metal substrate 1 and second wiring 5. On the other hand, curve 16 shows the voltages with the sample having no first electrode (the structure of FIG. 2). It is seen that there are voltages generated between metal substrate 1 and second wiring 5. Some minor voltage starts to emerge at the vicinity of 600° C., it reaches approximately 1V at the vicinity of 850° C. When it is kept at 850° C. for 30 min., the voltage increases to approximately 1.5 V. Even after the temperature is lowered from 850° C., the voltage still stays at high side. This seems to have been caused by the difference in thermal capacitance between the thermocouple used for temperature measurement and the metal substrate; or difference in temperature between the actual temperature inside the single furnace and that of sample itself.

Respective samples were likewise heated and measured in the voltage using heating means other than the single furnace. This experiment rendered the same results as described in the above.

From the results made available in FIG. 4A through FIG. 5B, the following inference may be drawn: The phenomenon of steeply decreasing insulation resistance, as shown in FIG. 4A, is particular to the case when a sintered electrode material containing at least Ag is used for second electrode 5. In the course of forming second electrode 5 (850° C. sintering), the glass (850° C. sintering) melts again. Then, the glass functions as a kind of solid electrolytic material, and generates a certain difference in the potential between metal substrate 1 and second electrode 5. This further works as a kind of battery, and invites a sudden decrease in the insulation resistance. First electrode 12 formed on metal substrate 1 effectively prevents generation of such voltages as illustrated in FIG. 5A.

It seems that, as a result of above scenario, even the sample having less number of glass layer counts (or, when thickness of glass layer is thin) can provide such a high insulation resistance as shown in FIG. 4B. When the glass layer is provided in the multi-layered structure, or the layer thickness of glass layer is made to be thicker than a certain specific value, occurrence of the pin hole due to dust, etc. can be suppressed and the strain sensors can be manufactured with a high production yield rate.

Embodiment 2

Figure 6:
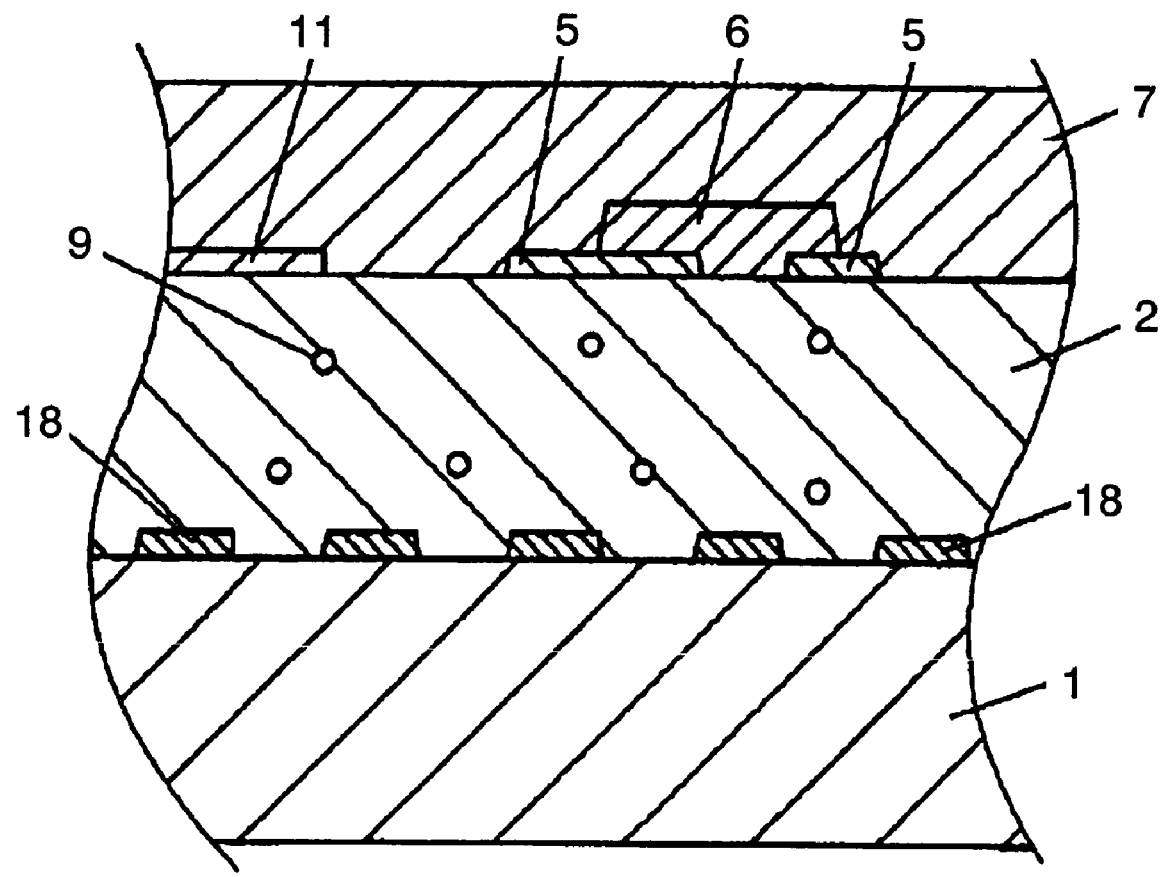
FIG. 6 shows a cross sectional view used to describe the pattern of first electrode.

Now, description is made with reference to FIG. 6 on the patterned shape of first electrode 12.

First electrode 12 is provided in the form of electrode pattern 18, which is disposed between metal substrate 1 and glass layer 2. For the purpose of preventing the battery effect generated between second electrode 5 and metal substrate 1, first electrode 18 does not necessarily need to be an entire plate. It may come either in such a regular pattern as mesh, checkers, polka dots, zigzags, or in a random pattern. First electrode provided in a patterned shape, instead of an entire plate, contributes to save the electrode material used for first electrode pattern, which leads to a cost reduction of finished products.

Embodiment 3

Now in embodiment 3, description is made on the composition of first electrode.

(Table 1) shows experimental results conducted on the composition of first electrode 12. The glass composition of $SiO_2$ alone does not provide sufficient adhesive strength.

A certain necessary adhesive strength is available by adding components of PbO, CaO, $Al_2O_3$, etc. for about 1 weight % to $SiO_2$. When $Bi_2O_3$ was used, preferred quantity was not less than 1 weight % not more than 10 weight %. If glass component is in excess of 30 weight %, its electrical resistance was too high, although enough adhesive strength was provided. This is not favorable in view of possible deterioration in the electrical characteristics of finished strain sensors.

TABLE 1

| Glass Composition | Component in first electrode (weight %) | Adhesive strength | Electrical resistance |
| --- | --- | --- | --- |
| SiO2 | (0–10) | X (peeled off) | ○ |
| SiO2 | (0.5–5) | X (peeled off) | ○ |
| SiO2 + Al2O3 | (0.5–5) + (0.1–5) | ○ | ⊙ |
| SiO2 + PbO | (0.5–5) + (0.1–5) (0.5–5) + (0.1–5) | ○ | ⊙ |
| SiO2 + CaO | (0.5–5) + (1–10) | ○ | ⊙ |
| SiO2 + Bi2O3 | | ○ | ⊙ |
| SiO2 + Al2O3 + Bi2O3 | (0.5–5) + 1 + (1–10) | ⊙ | ⊙ |
| SiO2 + PbO + Al2O3 | (0.5–5) + 1 + (0.1–5) | ⊙ | ⊙ |
| SiO2 + Bi2O3 + PbO | (0.5–5) + (1–10) + 1 | ⊙ | ⊙ |
| SiO2 + PbO + CaO | (0.5–5) + 1 + (0.1–5) | ⊙ | ⊙ |
| SiO2 + Al2O3 + PbO + Bi2O3 + CaO | (0.5–5) + (0.1–5) + (0.1–5) + (1–10) + (0.1–5), Total 25 weight % | ⊙ | ⊙ |
| SiO2 + Al2O3 + PbO + Bi2O3 + CaO | Total 30 weight % | ⊙ | X |

(○ Good, ⊙ Superior, X Rejected),
Notes
(1–10): not less than 1 weight %, not more than 10 weight %.
(1–2): not less than 1 weight %, not more than 2 weight %.

Embodiment 4

Now in embodiment 4, description is made on the composition of second electrode.

(Table 2) shows results of study conducted on the composition of second electrode 5.

The ($Al_2O_3$+$SiO_2$) alone does not provide enough adhesive strength. However, a certain necessary adhesive strength is available by adding components of CaO, NiO, CuO, PbO, etc. for about 0.1–1 weight %.

When $Bi_2O_3$ is used as the additive, preferred quantity is not less than 1 weight % not more than 10 weight %.

If glass component is in excess of 30 weight %, its electrical resistance goes too high, although enough adhesive strength is provided. This is not favorable in view of possible deterioration in the electrical characteristics of finished strain sensors. Addition of Pd component to second electrode 5 is effective to prevent a solder leaching. Second electrode 5 and wiring 11 may be put into a common member; by so doing, the number of printing process steps can be reduced to a cost reduction. Second electrode 5 can be used as wiring 11, on which other chip components or semiconductor devices may be mounted with solder.

When adding Pd component to second electrode, preferred adding quantity is not less than 5 weight % not more than 15 weight %. If it is less than 5 weight %, the effect of preventing a solder leaching is insufficient. If it is in excess of 15 weight %, the wiring resistance goes high and the cost of electrode also goes up. So, this is not preferred.

above, even a single-layered glass layer can maintain the insulation resistance high, and can reduce substantially the rate of short-circuit rejects.

If it is provided by laminating a plurality of glass layers, the rate of rejects due to pin hole, etc, can be significantly reduced to an improved production yield rate. The thermal expansion coefficient of glass layer can be harmonized with that of metal substrate, when the glass layer is formed with at least $SiO_2$, $Al_2O_3$, BaO as the main ingredient. Thickness of the glass layer should preferably be not less than 5 μm not more than 500 μm. If the thickness of glass layer is not more than 5 μm, the insulation resistance is sometimes lowered due to micro-holes, etc. generated in the glass layer, despite the formation of first electrode. On the other hand, a glass layer thicker than 500 μm invites an increased product cost.

First electrode, glass layer, second electrode, etc. should preferably be sintered in an oxidizing atmosphere at a temperature not lower than 600° C. not higher than 1000° C. If they are sintered at a temperature not higher than 600° C., sintering of electrode and glass layer might remain insufficient, which would lead to the insufficiency of physical strength and characteristics.

On the other hand, when the sintering temperature is higher than 1000° C., the electrode, the glass layer and even the metal substrate itself are required to be formed of

TABLE 2

| Glass Composition | Component in second electrode (weight %) | Adhesive strength | Electrical resistance |
|---|---|---|---|
| (Al2O3 + SiO2) | (0.1–5) + (0.5–5) | X (peeled off) | ⊚ |
| (Al2O3 + SiO2) + CaO | (0.1–5) + (0.5–5) + (0.1–5) | ◯ | ⊚ |
| (Al2O3 + SiO2) + NiO | (0.1–5) + (0.5–5) + (0.1–5) | ◯ | ⊚ |
| (Al2O3 + SiO2) + CuO | (0.1–5) + (0.5–5) + (0.1–5) | ◯ | ⊚ |
| (Al2O3 + SiO2) + Bi2O3 | (0.1–5) + (0.5–5) + (1–10) | ◯ | ⊚ |
| (Al2O3 + SiO2) + CaO + NiO + Bi2O3 | (0.1–5) + (0.5–5) + (0.1–5) + (0.1–5) + (1–10) | ⊚ | ⊚ |
| (Al2O3 + SiO2) + NiO + CuO + Bi2O3 | (0.1–5) + (0.5–5) + (0.1–5) + (0.1–5) + (1–10) | ⊚ | ⊚ |
| (Al2O3 + SiO2) + CaO + NiO + CuO | (0.1–5) + (0.5–5) + (0.1–5) + (0.1–5) + (0.1–5) | ⊚ | ⊚ |
| (Al2O3 + SiO2) + CaO + NiO + CuO + Bi2O3 | (0.1–5) + (0.5–5) + (0.1–5) + (0.1–5) + (1–10) Total 25 weight % | ⊚ | ⊚ |
| (Al2O3 + SiO2) + CaO + Co2O3 + NiO + CuO + Bi2O3 | Total 30 weight % | ⊚ | X |

(◯ Good, ⊚ Superior, X Rejected)
Notes
(0.1–5): not less than 0.1 weight %, not more than 5 weight %.
(0.5–5): not less than 0.5 weight %, not more than 5 weight %.

Embodiment 5

In embodiment 5, description is made on the Ag quantity contained in electrode. As to the materials for first electrode and second electrode, a certain resistance value needed for an electrode layer may be provided by having them to include Ag component for not less than 40 weight % (preferably not less than 60 weight %). Further addition of Pd, Pt, etc, enhances the reliability required for a wiring member. If the Ag component in first and second electrodes is not more than 40 weight %, resistance value of the electrode layers becomes too high and the product characteristics deteriorate. If glass component is in excess of 30 weight %, its electrical resistance goes too high; this is not favorable in view of possible deterioration in the electrical characteristics of finished strain sensors. As described in the materials of special kinds, which means expensive, and it may require an expensive sintering furnace. So, it is not a favorable choice. It is preferred that these items are sintered in an oxidizing atmosphere. If they are sintered in a reductive atmosphere, part of materials constituting glass layer (PbO, for example) is sometimes reduced, which would cause a lowered insulation resistance. The strain detecting resistor should preferably be sintered at a temperature not lower than 500° C. not higher than 900° C. If it is sintered at a temperature not higher than 500° C., or at a temperature not lower than 900° C., a certain specific strain detecting characteristic might not be provided. When an overcoat glass layer is used for the protection layer, an oxidizing atmosphere not lower than 400° C. not higher than 800° C. is preferred.

A temperature not higher than 400° C. might fail to provide a certain specific reliability.

If sintered at a temperature not lower than 800° C., the strain detecting characteristic might deteriorate. When sintered in a reductive atmosphere, part of glass components contained in the overcoat glass layer (PbO, for example) is sometimes reduced, which would fail to provide a certain specific reliability. Thickness of first electrode should preferably be not less than 0.1 µm not more than 100 µm. If it is thicker than 100 µm, the electrode might peel off the metal substrate by an internal stress generated during sintering. Furthermore, it creates a significant stepped level difference in the glass layer caused by the thick first electrode. This would bring about a problem in the later manufacturing steps. At the same time, this is a factor of cost increase. If thickness of first electrode is not more than 0.1 µm, it might fail to provide the glass layer with the effect for preventing the decreasing insulation resistance.

In the descriptions of the present invention, the adding quantity of respective components is expressed in terms of weight %, while oxides are expressed in terms of weight % as oxide. Proportion of the constituent elements can be made available by applying the XMA method (X-ray Micro-Analyzer) to the cross sectional surface, etc. of a finished product, or through the generally-available methods. In this case, the element is calculated in the oxide (for example, Al is handled as $Al_2O_3$).

As described in the above, when a structure consisting of metal substrate-glass-wiring is sintered, sometimes a certain voltage is generated between the metal substrate and the wiring, depending on kind of the glass and electrode materials. The voltage sometimes bring about a lowered insulation resistance between the metal substrate and the wiring.

The generation of voltage between metal substrate and wiring can be avoided by providing a silver wiring direct on the metal substrate. Thus, the drop of insulation resistance between metal substrate and wiring can be avoided. Furthermore, since electrical resistance of metal substrate itself can be lowered by first electrode formed on the metal substrate, it will provide designers of electrical circuits for strain sensors with more designing freedom and more room for the optimization.

Therefore, it is advantageous in improving the electrical characteristics of a strain sensor to provide also to such a glass which hardly generate a voltage during sintering with first electrode. As to material for the metal substrate, a ferrite system stainless steel containing Cr, $Al_2O_3$ is preferred in view of the heat-resisting property. A stainless steel substrate containing, for example, Cr for not less than 5 weight % not more than 20 weight % and $Al_2O_3$ for not less than 2 weight % not more than 10 weight %, will provide a sufficient physical strength needed for a strain sensor, as well as enough heat-resisting property withstanding a temperature up to the vicinity of 900° C. Furthermore, by adding Cr and $Al_2O_3$, which being common constituent elements with the metal substrate, also to the first electrode side, the mutual connection can be made more stable.

INDUSTRIAL APPLICABILITY

Reliable strain sensors can be offered at low cost, by providing metal substrate with first electrode in accordance with the present invention. Which electrode enhances the insulation resistance between metal substrate and second electrode.

The invention claimed is:

1. A method of manufacturing strain sensor comprising the steps of;
    providing a first electrode on a metal substrate,
    forming a glass layer for at least one layer on said first electrode,
    providing a second electrode and a wiring on said glass layer,
    providing a strain detecting resistor electrically connected with said second electrode, and
    forming an overcoat glass layer which covers at least one of said second electrode and said strain detecting resistor.

2. The method of manufacturing strain sensor recited in claim 1, wherein
    said first electrode, said glass layer and said second electrode are all sintered in an oxidizing atmosphere at a temperature not lower than 600° C. not higher than 900° C.

3. The method of manufacturing strain sensor recited in claim 1, wherein
    said overcoat glass layer is sintered in an oxidizing atmosphere at a temperature not lower than 400° C. not higher than 800° C.

* * * * *